(12) United States Patent
Suo (10) Patent No.: US 11,559,756 B2
(45) Date of Patent: Jan. 24, 2023

(54) CENTRIFUGAL FUEL PURIFYING APPARATUS

(71) Applicant: He Suo, Weihai (CN)

(72) Inventor: He Suo, Weihai (CN)

(73) Assignee: Weihai Suotong Efficient Technology Co., Ltd., Weihai (CN)

( * ) Notice: Subject to any disclaimer, the term of this patent is extended or adjusted under 35 U.S.C. 154(b) by 574 days.

(21) Appl. No.: 16/700,076

(22) Filed: Dec. 2, 2019

(65) Prior Publication Data

US 2020/0108335 A1 Apr. 9, 2020

Related U.S. Application Data

(63) Continuation of application No. PCT/CN2017/087576, filed on Jun. 8, 2017.

(30) Foreign Application Priority Data

May 3, 2017 (CN) .......................... 201710303227.7

(51) Int. Cl.
*B01D 19/00* (2006.01)
*B01D 21/34* (2006.01)
*B01D 21/00* (2006.01)

(52) U.S. Cl.
CPC ..... *B01D 19/0063* (2013.01); *B01D 19/0057* (2013.01); *B01D 21/0024* (2013.01); *B01D 21/0042* (2013.01); *B01D 21/34* (2013.01)

(58) Field of Classification Search
None
See application file for complete search history.

(56) References Cited

U.S. PATENT DOCUMENTS

| 4,098,696 A | 7/1978 | Humphrey et al. |
| 8,816,105 B2 | 8/2014 | Ristolainen et al. |
| 2005/0016905 A1 | 1/2005 | Lindow |
| 2008/0179227 A1* | 7/2008 | Saito ................. B01D 19/0057 210/512.1 |

FOREIGN PATENT DOCUMENTS

| CN | 101648166 A | 2/2010 |
| CN | 101648166 B | 5/2011 |

(Continued)

OTHER PUBLICATIONS

Internation Search Report of PCT/CN2017/087576, dated Feb. 6, 2018.

*Primary Examiner* — David C Mellon (57) ABSTRACT

The present invention discloses a centrifugal fuel purifying apparatus, including, a center shaft, a centrifugal cylinder, a shaft seat, a rotating skeleton, a disc type guide plate, a fuel gathering impeller, a rotating wheel, a vacuum pump, a fuel outlet pipe, a fuel inlet, pipe, a fuel unloading box, a pollutant receiving box, a tank body and a PLC controller, wherein the alarm fuel tank is arranged at the top in a tank body of the fuel tank, a fuel level meter is disposed within the alarm fuel tank, a fuel inlet is provided on the upper part of one side of the alarm fuel tank above the fuel level meter, a fuel outlet is provided on the lower part of one side of the alarm fuel tank below the fuel level meter, and the fuel inlet is communicated with the centrifugal cylinder through the fuel inlet pipe.

6 Claims, 5 Drawing Sheets

(56) References Cited

FOREIGN PATENT DOCUMENTS

| | | | |
|---|---|---|---|
| CN | 102179317 | A | 9/2011 |
| CN | 205808505 | U | 12/2016 |
| CN | 206054234 | U | 3/2017 |
| CN | 106890484 | A | 6/2017 |
| CN | 206700849 | U | 12/2017 |
| JP | 2001249045 | A | 9/2001 |

* cited by examiner

CENTRIFUGAL FUEL PURIFYING APPARATUS

CROSS-REFERENCE TO RELATED APPLICATIONS

This application is a continuation of International Patent Application No. PCT/CN2017/087576 with a filing date of Jun. 8, 2017, designating the United States, now pending, and further claims priority to Chinese Patent Application No. 201710303227.7 with a filing date of May 3, 2017. The content of the aforementioned applications, including any intervening amendments thereto, are incorporated herein by reference.

TECHNICAL FIELD

The present invention relates to the technical field of fuel purifying devices, and more particularly to a centrifugal fuel purifying apparatus.

BACKGROUND OF THE PRESENT INVENTION

As is well known, in order to save energy, used fuel is usually treated by a fuel purifying device, such that solid particles and gas particles in the fuel are separated and recycled.

Upon searching, CN 101648166 B discloses a high-precision centrifugal fuel purifying machine, including a flexible drawing pipe, a gear pump, a centrifugal machine, a pollutant receiving box, a motor and a fuel outlet pipe, wherein the flexible drawing pipe is connected with an input interface of the centrifugal machine to form a fuel inlet pipeline, and an, output interlace of the centrifugal machine is connected with the fuel outlet pipe to form a fuel outlet pipeline. The high-precision centrifugal fuel purifying machine has a PLC controller, a venting valve, a pressure sensor, a temperature sensor and an adjustable check valve, wherein the PLC controller controls the gear pump, the check valve and the motor according to pressure and temperature information detected by the pressure sensor and the temperature sensor. Such a structure has the following operating process: by means of the gear pump, fuel in a fuel tank of a user is transported to an inlet of the stationary centrifugal cylinder via the fuel inlet pipeline, air in the centrifugal cylinder is discharged from the outlet of the centrifugal cylinder, but air in the top may not be discharged completely, and a motor of the centrifugal cylinder is started by timing setting. The centrifugal cylinder rotates at a high speed. The fuel is adsorbed on a circular filter net within the centrifugal cylinder under an action of the centrifugal cylinder. Clean fuel converts a high-speed rotating dynamic pressure head into a static pressure head from a stationary impeller at the top, and is discharged from a fuel outlet of the centrifugal cylinder. The temperature sensor and the pressure sensor serve as detecting elements during operation. When an abnormal situation occurs, the fuel purifying machine is stopped immediately and protected from being damaged. When the fuel purifying effect is poor, a fuel passage may be switched by a manual valve to connect the fuel outlet of the centrifugal cylinder with a fuel inlet of the centrifugal cylinder, and the fuel is repeatedly purified by the centrifugal cylinder to achieve the purpose of fine filtration. The fuel purifying machine has the following substantial deficiencies. Firstly, there is the large-flow gear pump in a main fuel passage, that is, the gear pump adopts a high power of at least 4 KW, which causes a large disturbance to the fuel and accelerates the emulsification of water-containing fuel. The high-precision centrifugal fuel purifying machine is relatively large in energy consumption, and does not meet the requirements for energy conservation and environmental protection.

Secondly, there is no reliable signal detection in air discharge in the centrifugal cylinder. The drive motor of the centrifugal cylinder is started after the gear pump operates for 3-5 minutes by setting an empirical value, and such a method is unreliable. Field tests show that the flow rate of the fuel is greatly affected by temperature, viscosity and through-flow area. Incomplete air discharge in the centrifugal cylinder influences the efficiency and effect.

Thirdly, air mixed in the fuel cannot be discharged.

Fourthly, demulsification may not be performed.

Fifthly, a filter element is disposed within the centrifugal cylinder, there is a consumable material, and the service life of the filter element is greatly affected when the filter element rotates at a high speed.

Sixthly, a secondary purification loop causes the fuel to frictionally generate heat and the temperature to rise. Meanwhile, the secondary purification loop needs to be manually opened or closed, which brings the inconvenience to the operation.

There is provided a centrifugal fuel purifying machine with a patent number 2011100475331 by Sunstone Development Co., Ltd. The centrifugal fuel purifying machine includes a control system, a center shaft, a centrifugal cylinder, a shaft seat body, a rotating skeleton, a disc type guide plate, a fuel gathering impeller, a rotating wheel, a motor, a fuel outlet pipe, a fuel inlet pipe, a fuel unloading box and a fuel tank. The center shaft is disposed at a shaft center in the centrifugal cylinder. The shaft seat body is fixed at the lower half part of the center shaft via a guide sleeve. The fuel gathering impeller is fixed at the upper end of the center shaft. The rotating skeleton is sleeved on the center shaft. The rotating skeleton is composed of a sleeve and a supporting rod. The sleeve is sleeved on the center shaft. Two ends of the sleeve are in a sealed state. A plurality of supporting rods which are parallel with the center shaft are fixed on the outer side wall of the sleeve through two sides. The lower ends of the supporting rods are fixed to a concave inner cavity surface of a front end cover. A plurality of concave disc type guide plates are sequentially sleeved on the rotating skeleton from bottom to top. There is a certain interval between adjacent guide plates. The outer side surface of the front end cover is fixed with the lower half part of the centrifugal cylinder. The rotating wheel is fixed at the lower end of the centrifugal cylinder. The fuel outlet pipe communicated with an inner cavity of the center shaft is disposed at the upper end of the centrifugal cylinder. The rotating wheel is connected with the motor. Two adjacent blades of the inner cavity of the front end cover are communicated with a pollutant discharging pipe and the fuel inlet pipe from the bottom. The fuel inlet pipe is communicated with the fuel tank. The main fuel passage in the present invention does not need the gear pump to supply fuel, and the radial blade at the bottom of the centrifugal cylinder generates a vacuumizing effect when rotating at a high speed, so that the fuel stably flows into the centrifugal cylinder under an action of an atmospheric pressure without impact, without additional energy consumption, and without acceleration of the emulsification of the fuel. Moreover, a titanium alloy disc may be used to cut a link between the fuel and a water molecular chain and break a water-in-fuel film to release emulsified water, thereby effectively performing the demulsification. Although the above problems are solved, there are the following deficiencies Firstly, because the fuel tank is a flow buffer apparatus of the fuel purifying machine, fuel and gas are separated in the fuel tank. The purified fuel firstly enters the fuel tank and then enters a purifying cylinder via the bottom of the fuel, tank. In a fuel purifying process, the fuel unloading box is usually used to gather leaking fuel or fuel automatically flowing from an auxiliary fuel tank after air is discharged. When the fuel unloading box is filled with the fuel, the fuel in the fuel unloading box returns to a closed fuel tank for, repurification. However, sometime, a fuel level of the fuel unloading box of the existing centrifugal cylinder is detected by adopting a mechanical floating ball, the floating ball controls the opening or closing of the check valve through a lever, the floating ball reaches an upper position, the check valve is opened, and the liquid is recovered from the check valve to a pollutant receiving box, with the disadvantage of incapability of automatically determining a negative pressure value in the pollutant receiving box. The fuel level in the fuel unloading box is kept at a critical fuel level during normal operation, the recovery operation is frequently started or stopped, and gas is easily mixed into the pollutant receiving box, causing a pressure drop and resulting in problems of insensitivity during the use of the floating ball and unreliability of pipe breaking of the check valve. The fuel purifying machine is high in failure rate and low in operating efficiency. Sometimes, the liquid is controlled by disposing a fuel level meter within the fuel unloading box. When the fuel in the fuel unloading box reaches the upper position, the fuel level meter uploads, information to a control system, and the control system instructs a fuel unloading motor to operate, fuel in the fuel unloading box is pumped into the fuel tank, through a fuel unloading, pump, and then re-purified. When the fuel in the fuel unloading box reaches a lower position, the fuel in the fuel unloading box is pumped completely and the fuel unloading motor stops operating, with the disadvantages of large energy consumption of the fuel unloading pump and incapability of achieving the purposes of energy conversation and environmental protection.

Secondly, the lower end of the centrifugal cylinder is connected with the shaft seat body via a sealing, apparatus in a sealing manner. The centrifugal fuel purifying machine includes a shaft seat body, a graphite ring seat, a graphite ring, a sealing skeleton and a rotating skeleton. A fuel receiving groove is provided at the upper end, of the shaft seat body. One side of the fuel receiving groove is communicated with the fuel unloading box via a fuel outlet pipeline. The fuel receiving groove is a horizontal groove. The graphite ring seat is threaded with a center shaft connection threaded pipe of the shaft seat body. The graphite ring is disposed at the upper end of the graphite ring seat. The rotating skeleton is sleeved at the outer part of the graphite ring seat. The rotating skeleton is matched with the graphite ring via the sealing skeleton. The rotating skeleton drives the sealing skeleton to rotate at a high speed. A fuel film produces between the sealing, skeleton and the graphite ring, and produces a fuel seal. The fuel purifying machine has the following substantial deficiencies. In a long-term high-speed rotation process, friction occurs between the graphite ring and the sealing skeleton, resulting in an increasingly large gap. When the unloading amount of the fuel is greater than the fuel discharging amount of the fuel receiving groove, the fuel leaks along the gap to the outside of the centrifugal cylinder, in which may cause that the fuel purifying machine is poor in use performance, and is often repaired, resulting in extremely low production efficiency.

Thirdly, in a high-speed centrifugal rotation process of the centrifugal cylinder, a gap is formed by damage of a snap spring block to the side wall of a snap spring block tensioning groove due to stress concentration caused by the snap spring block to the snap spring block tensioning groove of the centrifugal cylinder, resulting in a sealing and fixing failure between the centrifugal cylinder and a butterfly skeleton.

Fourthly, generally, when the fuel is purified by adopting the centrifugal fuel purifying machine, the fuel to be purified is firstly pumped into the fuel tank. When a fuel level within the fuel tank is observed through a transparent pipe the bottom of which is communicated with the fuel tank, disposed at one side of the fuel tank reaches a certain height, the centrifugal cylinder is started again to operate. Air bubbles in the fuel will be pumped into the centrifugal cylinder with a circulation pump, which not only greatly shortens the service life of the centrifugal cylinder, but also requires an operator to observe a fuel filling condition within the transparent pipe and increases the labor cost.

SUMMARY OF PRESENT INVENTION

An objective of the present invention is to solve, the above-mentioned deficiencies of the prior art and to provide a centrifugal fuel purifying apparatus with novel structure, stable performance, high production efficiency, energy conversation and environmental protection, and high degree of automation.

The technical solution adopted by the present invention to solve the technical problem thereof is described as follows.

A centrifugal fuel purifying apparatus includes a center shaft, a centrifugal cylinder, a shaft seat, a rotating skeleton, a disc type guide plate, a fuel gathering impeller, a rotating wheel, a vacuum pump, a fuel outlet pipe, a fuel inlet pipe, a fuel unloading box, a pollutant receiving, box, a tank body and a PLC controller. The alarm fuel tank is arranged at the top of a tank body of the fuel tank. A fuel level meter is disposed within the alarm fuel tank. A fuel inlet is provided on the upper part of one side of the alarm fuel tank above the fuel level meter, refuel outlet is provided on the lower part of one side of the alarm fuel tank below the fuel level meter. The fuel inlet is communicated with the centrifugal cylinder via the fuel inlet pipe. When the fuel purifying machine is started, the vacuum pump is opened, and fuel of a user enters the tank body of the fuel tank under an action of a fuel suction vacuum pump. After the tank body of the fuel tank is filled with fuel, a valve is switched to the alarm fuel tank. When the fuel level meter in the alarm fuel tank senses that the tank body is filled with the fuel, gas between the centrifugal cylinder and a disc is discharged. The fuel level meter uploads sensed information to a control system. The control system automatically instructs a motor of the centrifugal cylinder to drive the centrifugal cylinder to start rotating under an action of a centrifugal force, which solves the substantial deficiency of an operator to observe a fuel level.

Figure 1:
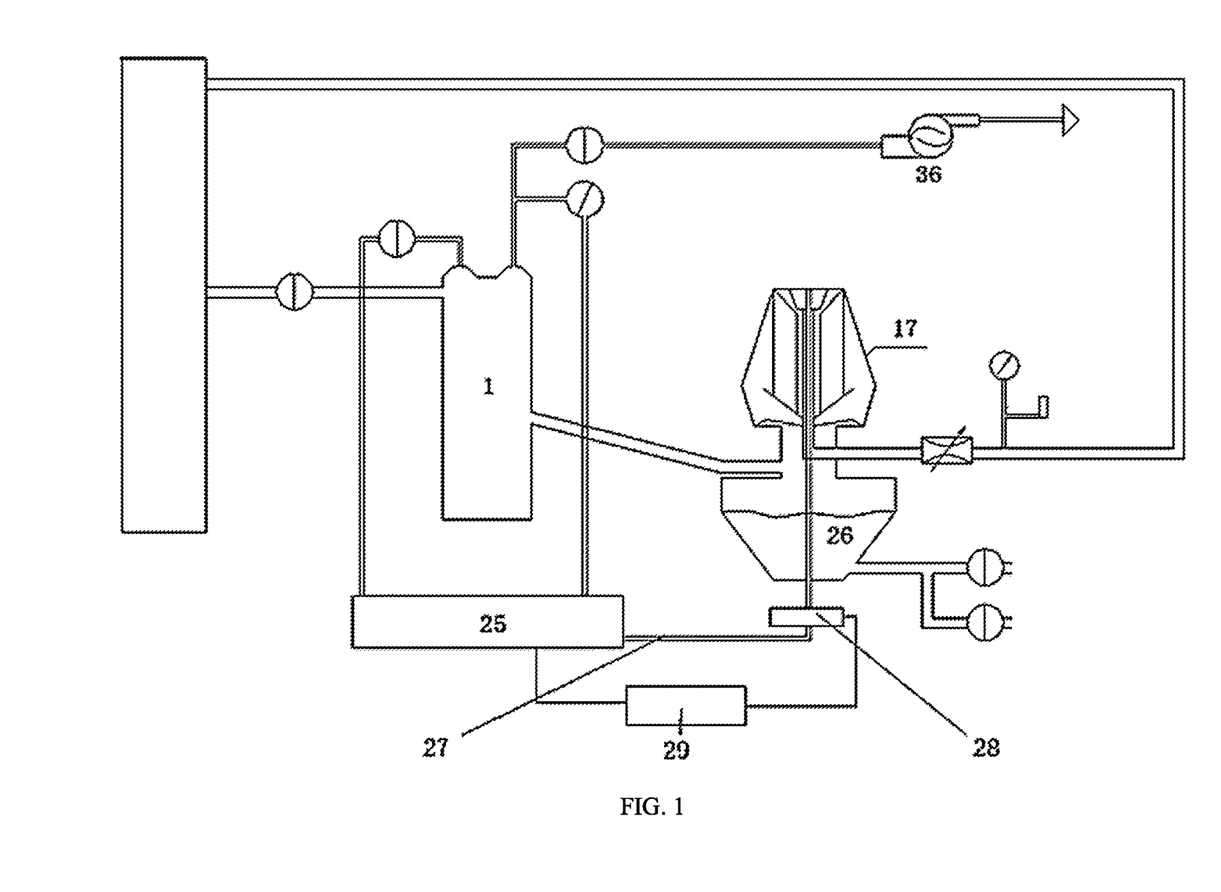
FIG. 1 is a schematic diagram showing a structure of the present invention.

As shown in FIG. 1, according to the present invention, a fuel unloading and recovering electromagnetic valve is disposed on a connecting fuel passage between the fuel unloading box and the pollutant receiving box, and the fuel unloading and recovering electromagnetic valve is connected with the PLC controller, in order to ensure that the entire fuel recovery system is in a scaled state and the pollutant receiving box is always in a negative pressure state inside, and achieve the functions of precise control, low failure rate, high operating efficiency, energy conversation and environmental protection.

According to the present invention, the fuel level meter is composed of a fuel level meter base, a fuel level meter rod, a floater and a snap spring. The fuel level meter rod between the fuel level meter base and the floater is composed of a straight rod section with a diameter of 8 mm and a straight rod section 35 with a diameter of 6 mm sequentially from top to bottom. The fuel level meter base is disposed on, the straight rod section with a diameter of 8 mm. The floater is disposed on the straight rod section with a diameter of 6 mm. By improving the shape of the fuel level meter rod, the frictional resistance in an up-down floating process in the fuel in the present invention is greatly reduced, and the sensitivity of the present invention to the fuel level detection in the fuel is improved. During operation, when the fuel level in the fuel unloading box reaches an upper limit of the fuel level meter, the fuel level meter transmits a fuel level upper limit signal to the PLC controller. After receiving the upper limit signal, the PLC controller determines an operating state of the centrifugal cylinder. If the centrifugal cylinder is in a stop state, the upper limit signal is reserved until the centrifugal cylinder reaches the set number of revolutions and has an outlet pressure of being greater than 0.01. At this time, a negative pressure value in the pollutant receiving box reaches a value of recovering the fuel in the fuel unloading box, the fuel unloading and recovering electromagnetic valve is opened, and the fuel in the fuel unloading box is recycled by the pollutant receiving box after passing through the fuel unloading and recovering electromagnetic valve via the fuel unloading box under an action of, an atmospheric pressure. When the fuel level in the fuel unloading box drops to a lower limit, the fuel level meter of the fuel unloading box outputs a lower limit signal to the PLC controller, the PLC controller instructs the fuel unloading and recovering electromagnetic valve to be closed, and a fuel unloading and recovering operation is terminated.

According to the present invention, a bubble removing apparatus may be disposed within the tank body. The bubble removing apparatus includes a curved plate and a guide plate. The guide plate is slanted within the tank body. The tank body is divided into a main fuel tank and an auxiliary fuel tank, so that a cavity which is wide in upper part and narrow in lower part is formed within the auxiliary fuel tank, and the cavity is favorable for solid impurities to flow down the guide plate. The top of the auxiliary fuel tank is communicated with the fuel inlet pipe, and an impurity discharging hole is provided at the bottom of the auxiliary fuel tank. The curved plate is horizontally disposed on the upper part in the main fuel tank, a fuel discharging nozzle is arranged at the bottom of the main fuel tank, a fuel, unloading pipe is arranged at the bottom of one side of the main fuel tank, and the curved plate is of a wave-shaped curved surface. One end of the curved plate is fixedly connected with the guide plate. When fuel in the auxiliary fuel tank is higher than the guide plate and flows onto the curved plate, gas impurities in the fuel are separated by means of bumping of the wave-shaped curved surface on the curved plate, and the purified fuel flows into the main fuel tank 4 through the other end of the curved plate 2. When fuel mixed with air enters, the fuel of the user enters the auxiliary fuel tank, in the tank body of the main fuel tank under the action of the fuel suction vacuum pump, and the fuel gradually rises along the guide plate. When the fuel is higher than the guide plate, the fuel flows towards the main fuel tank along the curved board. Because the curved plate is of the wave-shaped curved surface, most of the gas impurities in the fuel is separated by means of bumping of the wave-shaped curved surface on the curved plate, the purified fuel flows into the main fuel tank through the other end of the curved plate, so that the fuel is further purified, the content of the gas in the fuel entering the centrifugal cylinder is reduced, and the service life of the centrifugal cylinder and the degassing efficiency of the fuel purifying machine are greatly improved.

According to the present invention, a fuel receiving groove is provided at the upper end surface of the outer side of a center shaft connection threaded pipe of the shaft seat. The bottom surface of the fuel receiving groove is gradually spirally transitioned from a shallow groove to a deep groove in an axial direction to make accumulated liquid rapidly flow out to avoid overflow. A fuel retaining ring is disposed at an intersection of the shallow groove and the deep groove. A fuel returning hole is provided on the bottom surface of the deep groove on one side of the fuel retaining ring. The lower end of the fuel returning hole is connected with a connecting pipeline, so that the function of conveniently and rapidly gathering the fuel is achieved, the fuel is prevented from leaking, and the use performance of the fuel purifying machine is ensured.

According to the present invention, a top plate may be disposed on the outer side of a snap spring block tensioning groove of the cylinder body. The lower end of the top plate is perpendicularly fixedly connected with the bottom surface of the snap spring block tensioning groove of the cylinder body. Two ends of the top plate are respectively fixedly connected with the side wall of the snap spring block tensioning groove. The outer side of a snap spring block is in contact with the top plate, so that the function of tensioning and positioning a snap spring is achieved, and the substantial technical problem of forming a gap due to stress concentration caused by the snap spring block to the side wall of the snap spring block tensioning groove of the centrifugal cylinder is solved. During installation, the cylinder body of the centrifugal cylinder is sleeved on a butterfly skeleton, and the snap spring block tensioning, groove of the cylinder body of the centrifugal cylinder is aligned with a positioning and clamping groove of the butterfly skeleton, and then the outer end of the snap spring is clamped within a snap spring groove by using a snap spring clamp. The upper end of the snap spring is in contact with the butterfly skeleton, the snap spring blocks at two ends of the snap spring are clamped within the snap spring block tensioning groove of the cylinder body and the positioning and clamping groove of the butterfly skeleton, and the outer side of, the snap spring block is in contact with, the top plate, so that the substantial technical problem of forming the gap due to stress concentration caused by the snap spring block to the side wall of the snap spring block tensioning groove of the centrifugal cylinder is solved when the centrifugal cylinder rotates at a high speed.

According to the present invention, an inspection hole may be provided at the bottom of the main fuel tank, and the inspection hole is connected with the main fuel tank via an inspection hole flange in a sealing manner, so that the function of facilitating the maintenance of the fuel purifying machine is achieved.

The present invention has the advantages of novel structure, energy conversation and environmental protection, precise control, low failure rate, high operating efficiency and the like due to the adoption of the structure.

Reference numerals: tank body 1, curved plate 2, guide plate 3, main fuel tank 4, auxiliary fuel tank 5, fuel inlet pipe 6, impurity discharging hole 7, fuel discharging nozzle 8, fuel outlet pipe 9, inspection hole flange 10, alarm fuel tank 11, shaft seat 12, fuel return hole 13, fuel receiving groove 14, fuel retaining, ring 16, threaded pipe 15, cylinder body 17, butterfly skeleton 18, snap spring 19, snap spring block 20, snap spring groove 21, snap spring block tensioning groove 22, positioning and clamping groove 23, top plate 24, fuel unloading box 25, pollutant receiving box 26, connecting fuel passage 27, fuel discharging and recovering electromagnetic valve 28, PLC controller 29, fuel level meter base 30, fuel level meter rod 31, floater 32, snap spring 33, 8 mm straight rod section 34, 6 mm straight rod section 35, and vacuum pump 36.

DETAILED DESCRIPTION OF PREFERRED EMBODIMENTS

The present invention will be further described below with reference to accompanying drawings.

Figure 2:
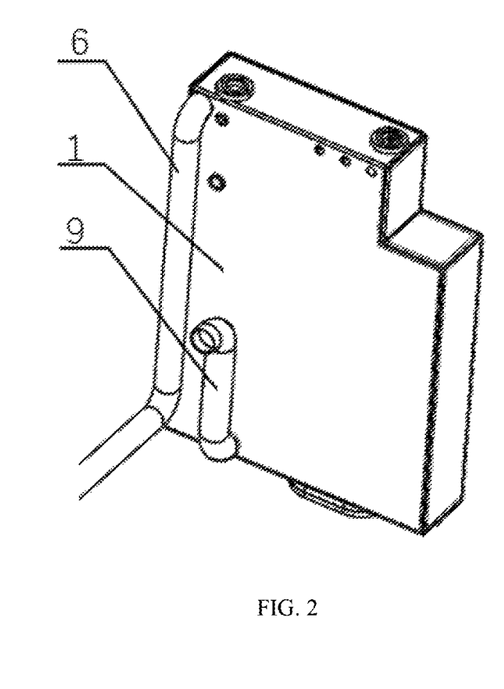
FIG. 2 is a schematic diagram of external reception of a fuel tank of the present invention.
Figure 3:
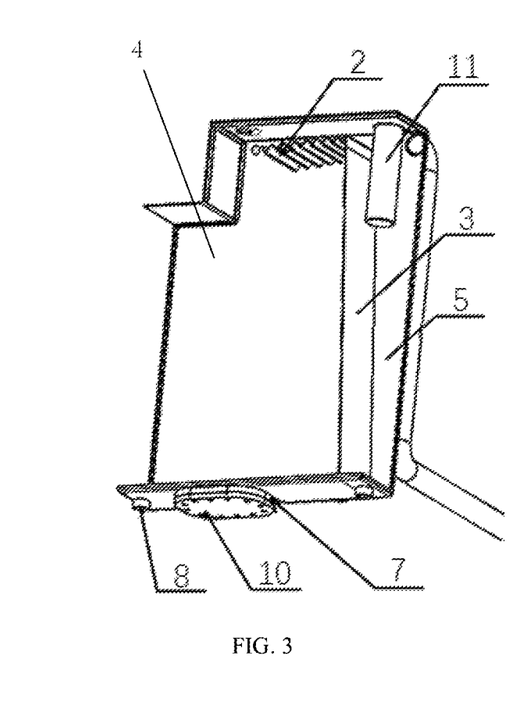
FIG. 3 is a cross-sectional view of FIG. 2.

As shown in FIG. 1, FIG. 2 and FIG. 3, a centrifugal fuel purifying apparatus includes a center shaft, a centrifugal cylinder, a shaft seat 12, a rotating skeleton, a disc type guide plate, a fuel gathering impeller, a rotating wheel, a vacuum pump 36, a fuel outlet pipe, a fuel inlet pipe, a fuel unloading box, a pollutant receiving box, a tank body 1 and a PLC controller 29. A connection relationship among the center shaft, the centrifugal cylinder, the shaft seat 12, the rotating skeleton, the disc type guide plate, the fuel gathering impeller, the rotating wheel, the vacuum pump 36, the fuel outlet pipe, the fuel inlet, pipe, the fuel unloading box, the pollutant receiving box, the fuel tank 1 and the PLC controller 29 may be the same as that of the prior art, and will be omitted here, wherein the alarm fuel tank 11 is arranged at the top of a tank body 1 of the fuel tank. A fuel level meter is disposed within the alarm fuel tank 11. A fuel inlet is provided on the upper part of one side of the alarm fuel tank 11 above the fuel level meter. A fuel outlet is provided on the lower part of one side of the alarm fuel tank 11 below the fuel level meter. The fuel inlet is communicated with the centrifugal cylinder via the fuel inlet pipe. When the fuel purifying machine is started, the vacuum pump is opened, and fuel of a user enters the tank body of the fuel tank under an action of a fuel suction vacuum pump. After the tank body of the fuel tank is filled with fuel, a valve is switched to the alarm fuel tank. When the fuel level meter in the alarm fuel tank senses that the tank body is filled with the fuel, gas between the centrifugal cylinder and a disc is discharged. The fuel level meter uploads sensed information to a control system. The control system automatically instructs a motor of the centrifugal cylinder to drive the centrifugal cylinder to start rotating under an action of a centrifugal force, which solves the substantial deficiency of an operator to observe a fuel level.

Figure 8:
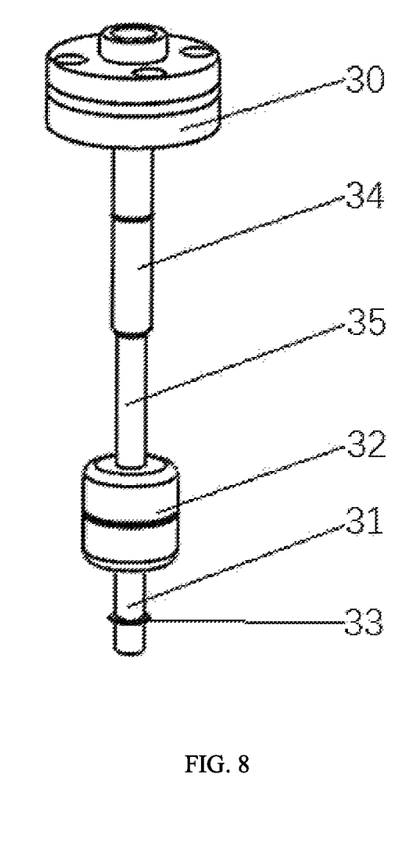
FIG. 8 is a schematic diagram showing a structure of a fuel level meter according to the present invention.

As shown in FIG. 1, according to the present invention, a fuel unloading and recovering electromagnetic valve 28 is disposed on a connecting fuel passage 27 between the fuel unloading box 25 and the pollutant receiving box 26, and the fuel unloading and recovering electromagnetic valve 28 is connected with the PLC controller 29, in order to ensure that the entire fuel recovery system is in a sealed state and the pollutant receiving box is always in a negative pressure state inside, and achieve the functions of precise control, low failure rate, high operating efficiency, energy conversation and environmental protection. According to the present invention, the fuel level meter is composed of a fuel level meter base 30, a fuel level meter rod 31, a floater 32 and a snap spring 33. The fuel level meter rod 31 between the fuel level meter base 30 and the floater 32 is composed of a straight rod section 34 with a diameter of 8 mm and a straight, rod section 35 with a diameter of 6 mm sequentially from top to bottom. The fuel level meter base is disposed, on the straight rod section with a diameter of 8 mm. The floater is disposed on the straight rod section with a diameter of 6 mm. By improving the shape of the fuel level meter rod, the frictional resistance in an up-down floating process in the fuel in the present invention is greatly reduced, and the sensitivity of the present invention to the fuel level detection in the fuel is improved. During operation, when the fuel level in the fuel unloading box reaches an upper limit of the fuel level meter, the fuel level meter transmits a fuel level upper limit signal to the PLC controller. After receiving the upper limit signal, the PLC controller determines an operating state of the centrifugal cylinder. If the centrifugal cylinder is in a stop state, the upper limit signal is reserved until the centrifugal cylinder reaches the set number of revolutions and has an outlet pressure of being greater than 0.01. At this time, a negative pressure value in the pollutant receiving box reaches a value of recovering the fuel in the fuel unloading, box, the fuel unloading and recovering electromagnetic valve is opened, and the fuel in the fuel unloading box is recycled by the pollutant receiving box after passing through the fuel unloading, and recovering electromagnetic valve via the fuel unloading box under an action of an atmospheric pressure. When the fuel level in the fuel unloading box drops to a lower limit, the fuel level meter of the fuel unloading box outputs a lower limit signal to the PLC controller, the PLC controller instructs the fuel unloading and recovering electromagnetic valve to be closed and a fuel unloading and recovering operation is terminated.

As shown in FIG. 2 and FIG. 3, according to the present invention, a bubble removing apparatus may be disposed within the tank body 1. The bubble removing apparatus includes a curved plate 2 and a guide plate 3. The guide plate is slanted within the tank body 1. The tank body 1 is divided into a main fuel tank 4 and an auxiliary fuel tank 5, so that a cavity which is wide in upper part and narrow in lower part is formed within the auxiliary fuel tank 5, and the cavity is favorable for solid impurities to flow down the guide plate 3. The top of the auxiliary fuel tank 5 is communicated with the fuel inlet pipe 6, and an impurity discharging hole 7 is provided at the bottom of the auxiliary fuel tank. The curved plate 2 is horizontally disposed on the upper part in the main fuel tank 4, a fuel discharging nozzle 8 is arranged at the bottom of the main fuel tank, the fuel outlet pipe 9 is arranged at the bottom of one side of the main fuel tank, and the curved plate 2 is of a wave-shaped curved surface. One end of the curved plate 2 is, fixedly connected with the guide plate 3. When fuel in the auxiliary fuel tank 5 is higher than the guide plate 3 and flows onto the curved plate 2, gas impurities in the fuel are separated by means of bumping of the wave-shaped curved surface on the curved plate 2, and the purified fuel flows into the main fuel tank 4 through the other end of the curved plate 2. When fuel mixed with air enters, the fuel of the user enters the auxiliary fuel tank in the tank body of the main fuel tank under the action of the fuel suction vacuum pump, and the fuel gradually rises along the guide plate. When the fuel is higher than the guide plate, the fuel flows towards the main fuel tank along the curved board. Because the curved plate is of the wave-shaped curved surface, most of the gas impurities in the fuel is separated by means of bumping of the wave-shaped curved surface on the curved plate, the purified fuel flows into the main fuel tank through the other end of the curved plate, so that the fuel is further purified, the content of the gas in the fuel entering the centrifugal cylinder is reduced, and the service life of the centrifugal cylinder and the degassing efficiency of the fuel purifying machine are greatly improved.

Figure 4:
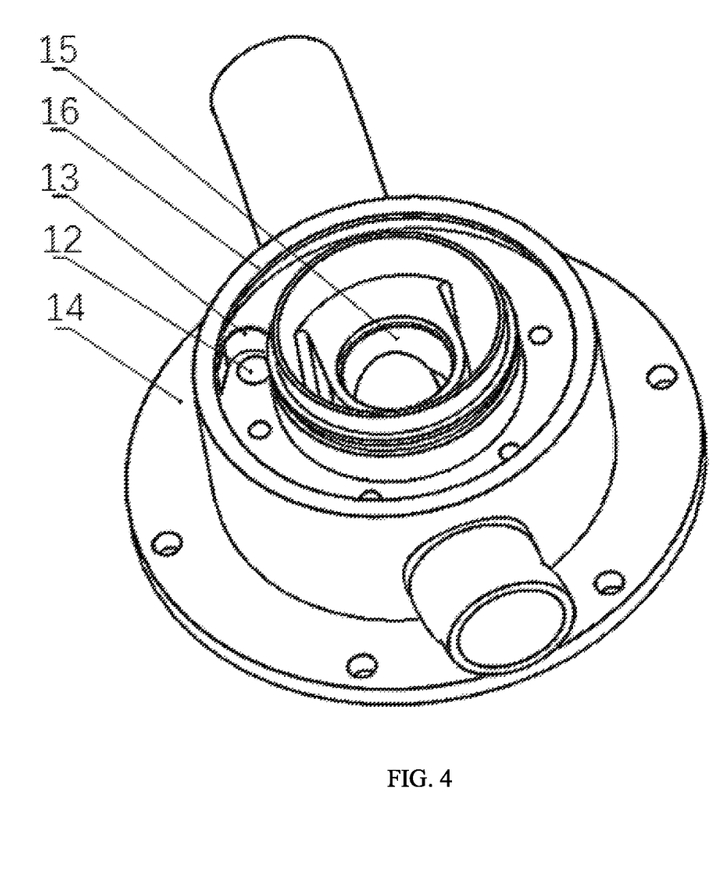
FIG. 4 is a schematic diagram showing a structure of a shaft seat according to the present invention.

As shown in FIG. 4, according to the present invention, a fuel receiving groove 14 is provided at the upper end surface of the outer side of a center shaft connection threaded pipe 15 of the shaft seat 12. The bottom surface of the fuel receiving groove 14 is gradually spirally transitioned from a shallow groove to a deep groove in an axial direction to make accumulated liquid rapidly flow out to avoid overflow. A fuel retaining ring 16 is disposed at an intersection of the shallow groove and the deep groove. A fuel returning hole 13 is provided on the bottom surface of the deep groove on one side of the fuel retaining ring 16. The lower end of the fuel returning hole 13 is connected with a connecting pipeline, so that the function of conveniently and rapidly gathering the fuel is achieved, the fuel is prevented from leaking, and the use performance of the fuel purifying machine is ensured.

Figure 5:
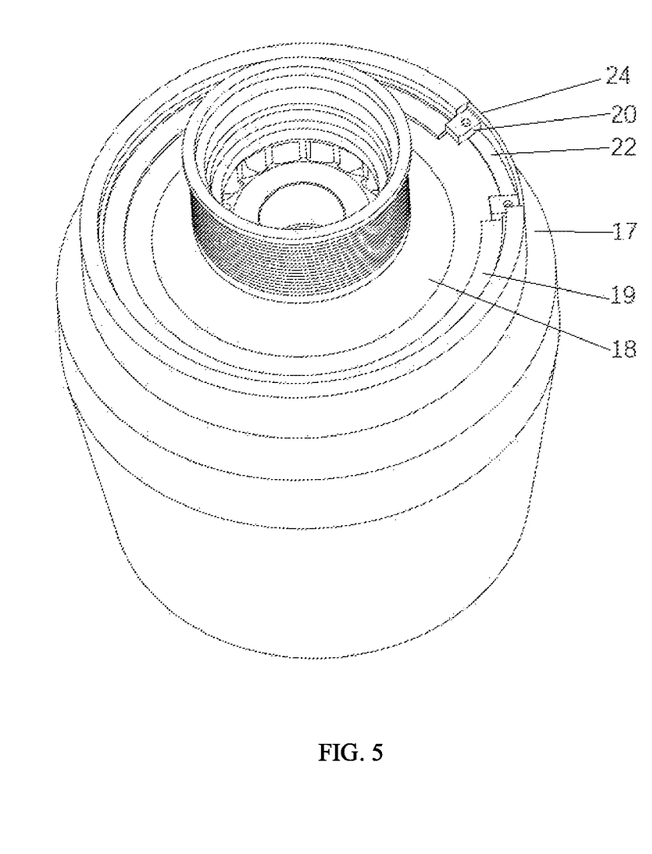
FIG. 5 is a schematic diagram showing a structure of a centrifugal cylinder according to the present invention.
Figure 6:
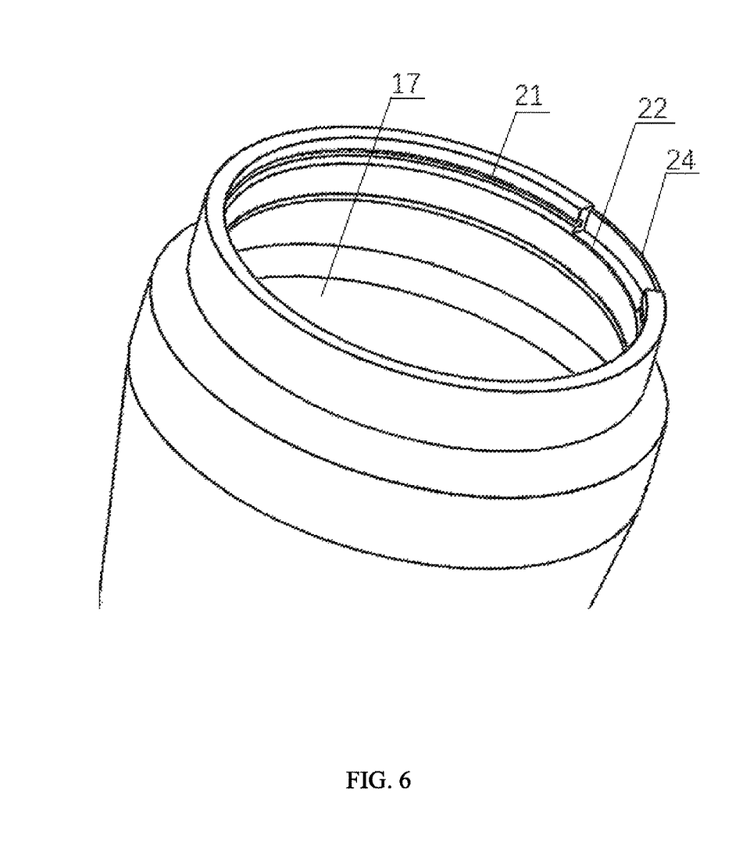
FIG. 6 is a partial view of FIG. 5.
Figure 7:
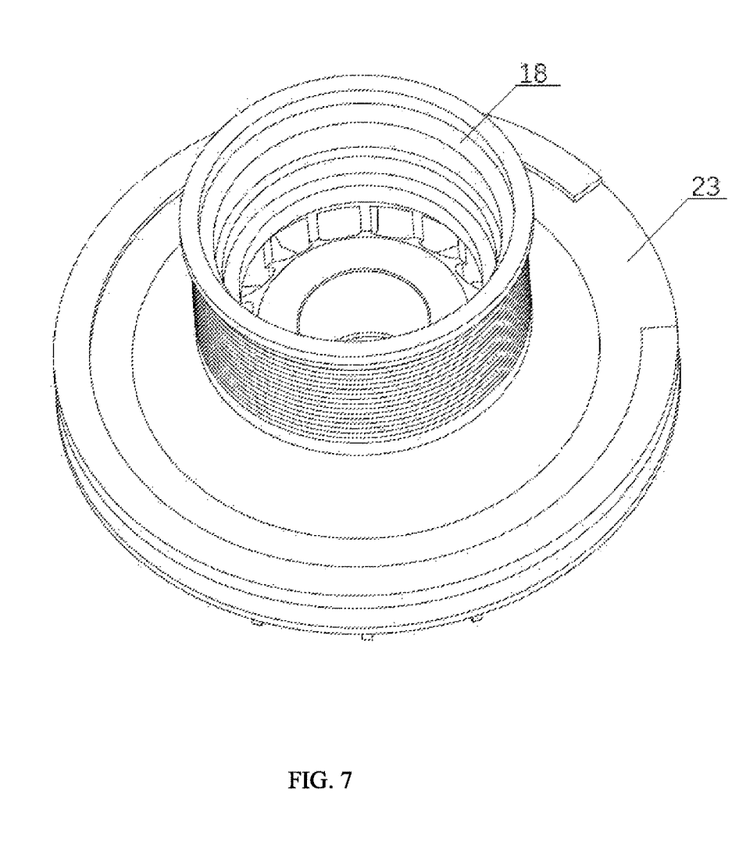
FIG. 7 is a schematic diagram showing a structure of a butterfly skeleton according to the present invention.

As shown in FIG. 5, FIG. 6 and FIG. 7, according to the present invention, a top plate 24 may be disposed on the outer side of a snap spring block tensioning groove 22 of the cylinder body 17. The lower end of the top plate 24 is perpendicularly fixedly connected with the bottom surface of the snap spring block tensioning groove 22 of the cylinder body 17. Two ends of the, top plate are respectively fixedly connected with the side wall of the snap spring block tensioning groove 22. The outer side of a snap spring block 20 is in contact with the top plate 24, so that the function of tensioning and positioning a snap spring is achieved, and the substantial technical problem of forming a gap due to stress concentration caused by the snap spring block to the side wall of the snap spring block tensioning groove of the centrifugal cylinder is solved. During installation, the cylinder body of the centrifugal cylinder 17 is sleeved on a butterfly skeleton, and the snap spring block tensioning groove 22 of the cylinder body 17 of the centrifugal cylinder is aligned with a positioning and clamping groove of the butterfly skeleton 18, and then the outer end of the snap spring is clamped within a snap spring groove 21 by using a snap spring clamp. The upper end of the snap spring is in contact with the butterfly skeleton 18, the snap spring blocks 20 at two ends of the snap spring 19 are clamped within the snap spring block tensioning groove 22 of the cylinder body 17 and the positioning and clamping, groove 23 of the butterfly skeleton 18, and the outer side of the snap spring block 20 is in contact with the top plate 24, so that the substantial technical problem, of forming the gap due to stress concentration caused by the snap spring block to the side, wall of the snap spring block tensioning groove of the centrifugal cylinder is solved when the centrifugal cylinder rotates at a high speed.

According to the present invention, an inspection hole may be provided at the bottom of the main fuel tank 4, and the inspection hole is connected with the main fuel tank via an inspection hole flange 10 in a sealing manner, so that the function of facilitating the maintenance of the fuel purifying machine is achieved.

The present invention has the advantages of novel structure, energy conversation and environmental protection, precise control, low failure rate, high operating efficiency and the like due to the adoption of the structure.

I claim:

1. A centrifugal fuel purifying apparatus, comprising a center shaft, a centrifugal cylinder, a shaft seat, a rotating skeleton, a disc type guide plate, a fuel gathering impeller, a rotating wheel, a vacuum pump, a fuel outlet pipe, a fuel inlet pipe, a fuel unloading box, a pollutant receiving box, a tank body and a PLC controller, wherein an alarm fuel tank is arranged at the top of a tank body of a fuel tank, a fuel level meter is disposed within the alarm fuel tank, a fuel inlet is provided on the upper part of one side of the alarm fuel tank above the fuel level meter, a fuel outlet is provided on the lower part of the alarm fuel tank below the fuel level meter, and the fuel inlet is communicated with the centrifugal cylinder through the fuel inlet pipe; and a bubble removing apparatus is disposed within the tank body, wherein the bubble removing apparatus comprises a curved plate and a guide plate, wherein the guide plate is slanted within the tank body, and the tank body is divided into a main fuel tank, and an auxiliary fuel tank, so that a cavity which is wide in upper part and narrow in lower part is formed within the auxiliary fuel tank, the top of the auxiliary fuel tank is communicated with the fuel inlet pipe, an impurity discharging hole is provided at the bottom of the auxiliary fuel tank, the curved plate is horizontally disposed on the upper part in the main fuel tank, a fuel unloading nozzle is arranged at the bottom in the main fuel tank, the fuel outlet pipe is arranged at the bottom of one side of the main fuel tank, the curved plate is of a wave-shaped curved surface, and one end of the curved plate is fixedly connected with the guide plate.

2. The centrifugal fuel purifying apparatus according to claim 1, wherein a fuel unloading and recovering electromagnetic valve is disposed on a connecting fuel passage between the fuel unloading box and the pollutant receiving box, and the fuel unloading and recovering electromagnetic valve is connected with the PLC controller.

3. The centrifugal fuel purifying apparatus according to claim 1, wherein the fuel level meter is composed of a fuel level meter base, a fuel level meter rod, a floater and a snap spring, wherein the fuel level meter rod between the fuel level meter base and the floater is composed of a straight rod section with a diameter of 8 mm and a straight rod section (35) with a diameter of 6 mm sequentially from top to bottom, the fuel level meter base is disposed on the straight rod section with a diameter of 8 mm, and the floater is disposed on the straight rod section with a diameter of 6 mm.

4. The centrifugal fuel purifying apparatus according to claim 1, wherein a fuel receiving groove is provided at the upper end surface of the outer side of a center shaft connection threaded pipe of the shaft seat, and the bottom surface of the fuel receiving groove is gradually spirally transitioned from a shallow groove to a deep groove in an axial direction to make accumulated liquid rapidly flow out to avoid overflow, a fuel retaining ring is disposed at an intersection of the shallow groove and the deep groove, a fuel returning hole is provided on the bottom surface of the deep groove on one side of the fuel retaining ring, and the lower end of the fuel returning hole is connected with a connecting pipeline.

5. The centrifugal fuel purifying apparatus according to claim 1, wherein a top plate is disposed on the outer side of a snap spring block tensioning groove of a cylinder body, the lower end of the top plate is perpendicularly fixedly connected with the bottom surface of the snap spring block tensioning groove of the cylinder body, two ends of the top plate are respectively fixedly connected with the side wall of the snap spring block tensioning groove, and the outer side of a snap spring block is in contact with the top plate.

6. The centrifugal fuel purifying apparatus according to claim 4, wherein an inspection hole is provided at the bottom of the main fuel tank, and, the inspection hole is connected with the main fuel tank through an inspection hole flange in a sealing manner.

\* \* \* \* \*